United States Patent
Shieh et al.

(10) Patent No.: US 12,200,476 B2
(45) Date of Patent: *Jan. 14, 2025

(54) MANAGING MOBILE DEVICE VOICE OVER WI-FI HANDOVER

(71) Applicant: AT&T Intellectual Property I, L.P., Atlanta, GA (US)

(72) Inventors: Hugh Shieh, Fall City, WA (US); William Rosenberg, Austin, TX (US); Arnold Schrider, Mercer Island, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,149

(22) Filed: Jan. 25, 2024

(65) Prior Publication Data
US 2024/0172073 A1 May 23, 2024

Related U.S. Application Data

(63) Continuation of application No. 18/161,192, filed on Jan. 30, 2023, now Pat. No. 11,917,477, which is a
(Continued)

(51) Int. Cl.
*H04W 36/36* (2009.01)
*H04W 36/00* (2009.01)

(52) U.S. Cl.
CPC ..... *H04W 36/36* (2013.01); *H04W 36/00226* (2023.05)

(58) Field of Classification Search
CPC H04W 36/00226; H04W 36/36; H04W 36/24
See application file for complete search history.

(56) References Cited

U.S. PATENT DOCUMENTS 11,368,906 B2* 6/2022 Smith ................... H04W 72/04
2019/0349821 A1* 11/2019 Kim ...................... H04L 5/0032
(Continued)

OTHER PUBLICATIONS

"Non- Final Office Action received for U.S. Appl. No. 17/221,964", Jul. 8, 2022, 18 Pages.
(Continued)

*Primary Examiner* — Hashim S Bhatti
(74) *Attorney, Agent, or Firm* — Guntin & Gust, PLC; Kenneth S. Kwan

(57) ABSTRACT

The disclosed technology is directed towards preventing a handover of a Wi-Fi call to a Fifth Generation (5G) standalone cellular network. In one alternative, a 5G standalone usage setting is disabled on a mobile device when Wi-Fi calling is enabled on the mobile device. In another alternative, a 5G standalone usage setting is disabled on a mobile device when Wi-Fi calling is enabled on the mobile device and the mobile device is connected to a Wi-Fi network, which facilitates camping on a 5G standalone network when the mobile device is not connected to a Wi-Fi network. In yet another alternative, a 5G standalone usage setting is disabled on a mobile device when an evolved packet data gateway (ePDG) tunnel is set up on the mobile device, which similarly facilitates camping on a 5G standalone network when the ePDG tunnel is torn down.

20 Claims, 12 Drawing Sheets

Related U.S. Application Data continuation of application No. 17/221,964, filed on Apr. 5, 2021, now Pat. No. 11,589,279.

(56) References Cited

U.S. PATENT DOCUMENTS

| | | | |
|---|---|---|---|
| 2021/0105691 A1* | 4/2021 | Zhu | H04L 43/0829 |
| 2021/0153290 A1* | 5/2021 | Ahmad | H04W 76/16 |
| 2022/0191683 A1* | 6/2022 | Shah | G10L 15/22 |
| 2022/0264418 A1* | 8/2022 | Yang | H04W 36/38 |

OTHER PUBLICATIONS

"Notice of Allowance received for U.S. Appl. No. 17/221,964", Oct. 20, 2022, 18 Pages.

* cited by examiner

MANAGING MOBILE DEVICE VOICE OVER WI-FI HANDOVER

RELATED APPLICATION

The subject patent application is a continuation of, and claims priority to, U.S. patent application Ser. No. 18/161,192, filed Jan. 30, 2023, which is a continuation of, and claims priority to, U.S. patent application Ser. No. 17/221,964, filed Apr. 5, 2021 (now U.S. Pat. No. 11,589,279). All sections of the aforementioned application(s) and/or patent(s) are incorporated herein by reference in their entirety.

TECHNICAL FIELD

The subject application relates to wireless communications systems in general, and more particularly to New Radio (NR) including fifth generation (5G) standalone cellular wireless communications systems and/or other next generation networks.

BACKGROUND

Fifth generation standalone (5G SA) networks are in various stages of being launched. A number of issues have been discovered during testing, including in the 5G Core Access and Mobility Management Function node (AMF, which receives connection and session related data from mobile devices) and Unified Data Management node (UDM, which maintains user-related data).

These issues are being resolved. However, one such issue results in a call drop scenario due to missing network feature(s) in the 5G AMF and UDM nodes. This issue cannot be resolved in a straightforward way, as the current standards-based solution is part of the problem.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
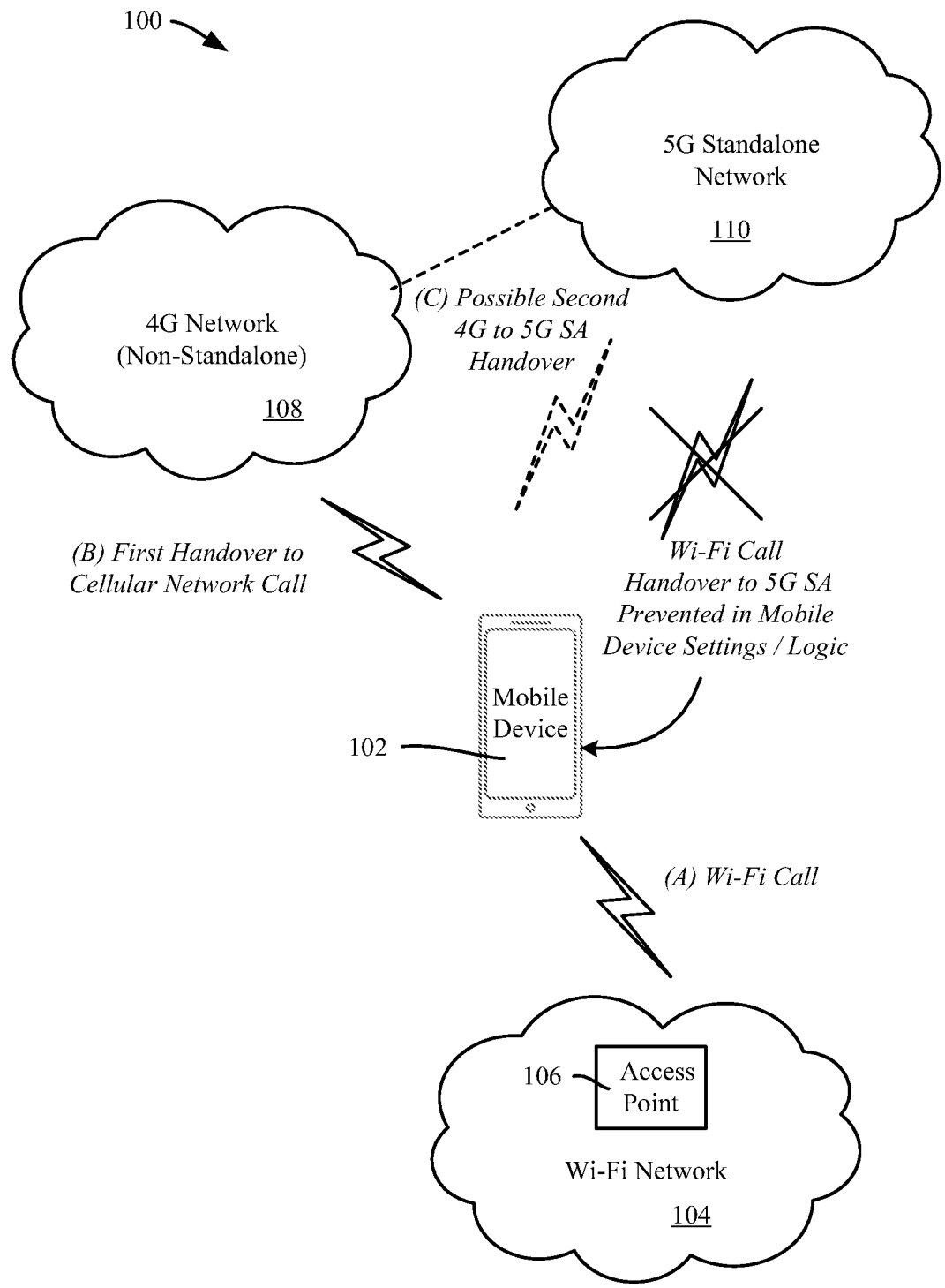
FIG. 1 is a block diagrams illustrating an example network communication system in which a mobile device can connect to a Wi-Fi network and cellular networks, in accordance with various aspects and embodiments of the subject disclosure.

Described herein is a technology for a mobile device (e.g., a smartphone) to determine an appropriate handover of a call to a cellular network. In general, a network issue in the 5G Core Access and Mobility Management Function (AMF) and Unified Data Management (UDM) nodes causes a voice call to be dropped when a Voice over Wi-Fi call handover is performed from a Wi-Fi network access point to a 5G standalone network. The technology described herein operates to prevent such a dropped call scenario.

As part of resolving the dropped Voice over Wi-Fi call handover issue, described herein are alternatives to prevent a handover of a Voice over Wi-Fi call to a 5G standalone cellular network. In one or more implementations described herein, the mobile device is configured to prevent the handover of Voice over Wi-Fi call to a 5G standalone network, regardless of whether or not a 5G standalone network is currently available to the mobile device. Thus, when a handover of a Wi-Fi call to a cellular network is needed, the handover is to a 4G network/5G non-standalone network or the like, hence avoiding the aforementioned call drop issue. An added benefit of this approach is that it generally can shorten the handover delay and reduces potential voice clipping.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream.

The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a mobile device (e.g., a smartphone) 102 is capable of wirelessly connecting to a Wi-Fi network 104, e.g., via an access point 106 or the like, to a 4G (e.g., 4G LTE, or other non-5G standalone) cellular network 108, and to a 5G standalone network 110. Described herein are alternatives for preventing a handover from a Wi-Fi call of the mobile device 102 connected to Wi-Fi network 104 to the 5G standalone network 110. In one or more implementations, the 5G standalone handover is prevented by mobile device settings and logic in the mobile device, as generally described with reference to FIGS. 2-7. Instead, when a handover is needed, the handover is to the 4G cellular network 108, for example.

Figure 2:
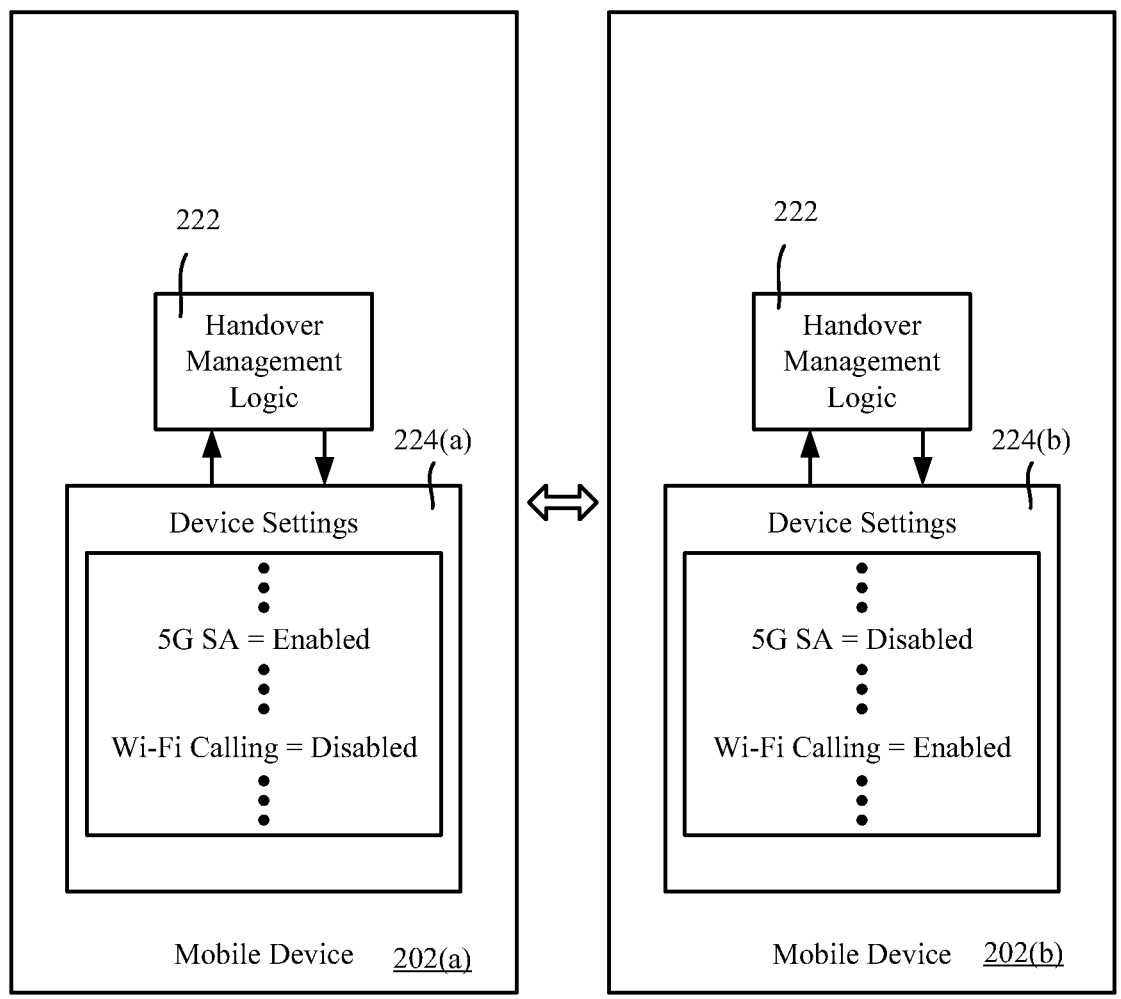
FIG. 2 is a block diagrams illustrating example components in a mobile device for managing a 5G standalone usage setting based on a Wi-Fi calling setting, in accordance with various aspects and embodiments of the subject disclosure.

FIG. 2 shows a first technology for preventing a 5G standalone handover, namely based on whether Wi-Fi calling is enabled (that is, turned on or the like, which can be maintained in mobile device memory in various ways, e.g., a Boolean one (1) for on/enabled, a zero (0) for off/disabled and so on). In a first state of a mobile device 202(*a*), handover management logic 222 allows 5G standalone to be enabled in the device settings 224(*a*) as long as Wi-Fi calling is disabled. Note that the user can choose to manually toggle (disable if enabled, enable if disabled) the 5G standalone setting when the mobile device 202(*a*) is in this first state with Wi-Fi calling disabled.

In contrast, in a second state of the mobile device 202(*b*), when the user enables Wi-Fi calling in the (now modified) device settings 224(*b*), the handover management logic 222 automatically toggles off 5G standalone (if 5G standalone was enabled) in the modified device settings 224(*b*). As a result, when a handover of a voice over Wi-Fi call to a cellular radio access network needs to be performed, the device takes the conventional actions to handover the call to 4G instead of 5G standalone, and thereby avoids the call drop issue. Thus, if the Wi-Fi calling toggle is turned on by the user, e.g., via a device settings menu, the mobile device turns the 5G standalone toggle off, so that when it is time to handover the voice over Wi-Fi call to cellular RAN, the device performs the handover of the call to 4G instead of 5G. Further, the handover management logic deactivates (e.g., grays out) the ability to manually toggle the 5G standalone setting from disabled to enabled. Note that if the user later disables Wi-Fi calling, the 5G standalone setting is restored by the handover management logic 222 to its previous state, e.g., 5G standalone is able to re-enabled as in the example of FIG. 2; however if previously manually disabled by the user, to the previous disabled state (not explicitly shown). The ability to manually toggle the 5G standalone setting is also reactivated when Wi-Fi calling is disabled.

Figure 3:
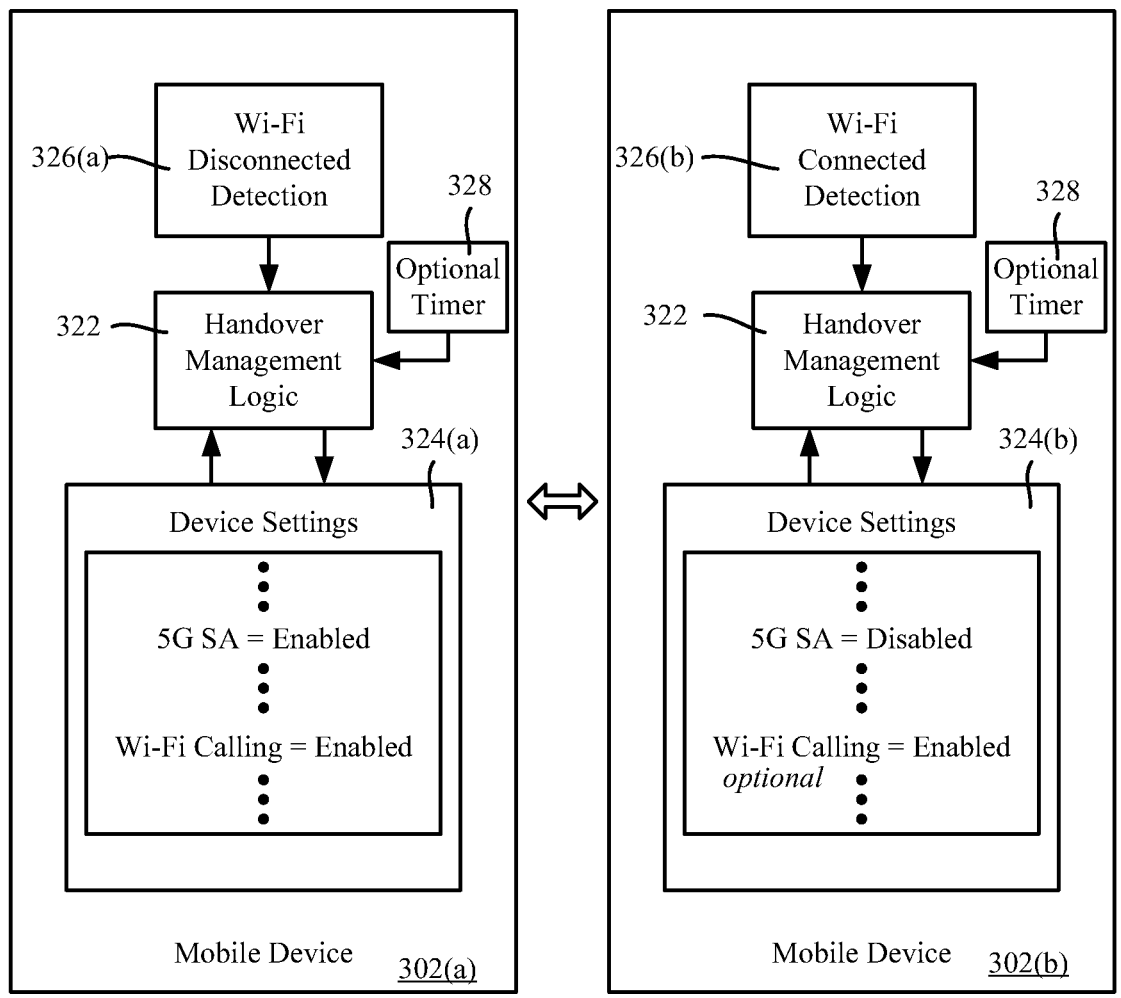
FIG. 3 is a block diagrams illustrating example components in a mobile device for managing a 5G standalone usage setting based on a Wi-Fi calling setting and Wi-Fi connection state, in accordance with various aspects and embodiments of the subject disclosure.

One potential side effect of the settings-based determination in FIG. 2 is that the mobile device does not camp on 5G standalone radio access network under what many users consider to be normal situations. FIG. 3 shows an alternative technology, in which when the Wi-Fi calling setting is toggled to enabled, the device automatically sets the 5G standalone setting to disabled only when the device is also connected to a Wi-Fi access point, and restores the previous 5G standalone setting (e.g., re-enables5G standalone) when the device disconnects from Wi-Fi.

In the example of FIG. 3, in a first state of a differently configured mobile device 302(*a*), handover management logic 322 allows 5G standalone to be enabled in the device settings 324(*a*) when Wi-Fi is disconnected (block 326(*a*)), regardless of whether Wi-Fi calling is enabled (as in the device settings 324(*a*)) or not, which can be when Wi-Fi signal strength drops below a threshold level, for example. Note that the user can choose to manually toggle (disable if enabled, enable if disabled) the 5G standalone setting when the mobile device 302(*a*) is in this first state with Wi-Fi calling enabled but no Wi-Fi connection exists.

In a second state of the mobile device 302(*b*), when the mobile device 302(*b*) with Wi-Fi calling enabled in the settings 324(*b*) connects to a Wi-Fi network, the handover management logic 322 automatically toggles off 5G standalone (if 5G standalone was enabled) in the modified device settings 324(*b*). As a result, when a handover of a voice over Wi-Fi call to a cellular radio access network needs to be performed, the mobile device 302(*b*) in this state takes the conventional actions to handover the call to 4G instead of 5G standalone, and thereby avoids the call drop issue. In other words, if Wi-Fi calling is enabled and the user is connected to a Wi-Fi network, the mobile device turns the 5G standalone toggle off, so that when it is time to handover the voice over Wi-Fi call to cellular RAN, the device performs the handover of the call to 4G instead of 5G. Further, when the mobile device 302(*b*) is in this second state, the handover management logic 322 deactivates (e.g., grays out) the ability to manually toggle the 5G standalone setting from disabled to enabled. Note that if the user later disables Wi-Fi calling or disconnects from a Wi-Fi network, the 5G standalone setting is restored by the handover management logic 322 to its previous state, e.g., 5G standalone is able to re-enabled as in the example of FIG. 3; however if previously manually disabled by the user, to the previous disabled state (not explicitly shown). The ability to manually toggle the 5G standalone setting is also reactivated when Wi-Fi calling is disabled or the device is not connected to Wi-Fi network. As can be seen, this alternative technology has the benefit of solving the drop issue, yet retains the ability for the device to camp on a 5G standalone radio access network when otherwise needed during disconnected Wi-Fi scenarios.

Figure 4:
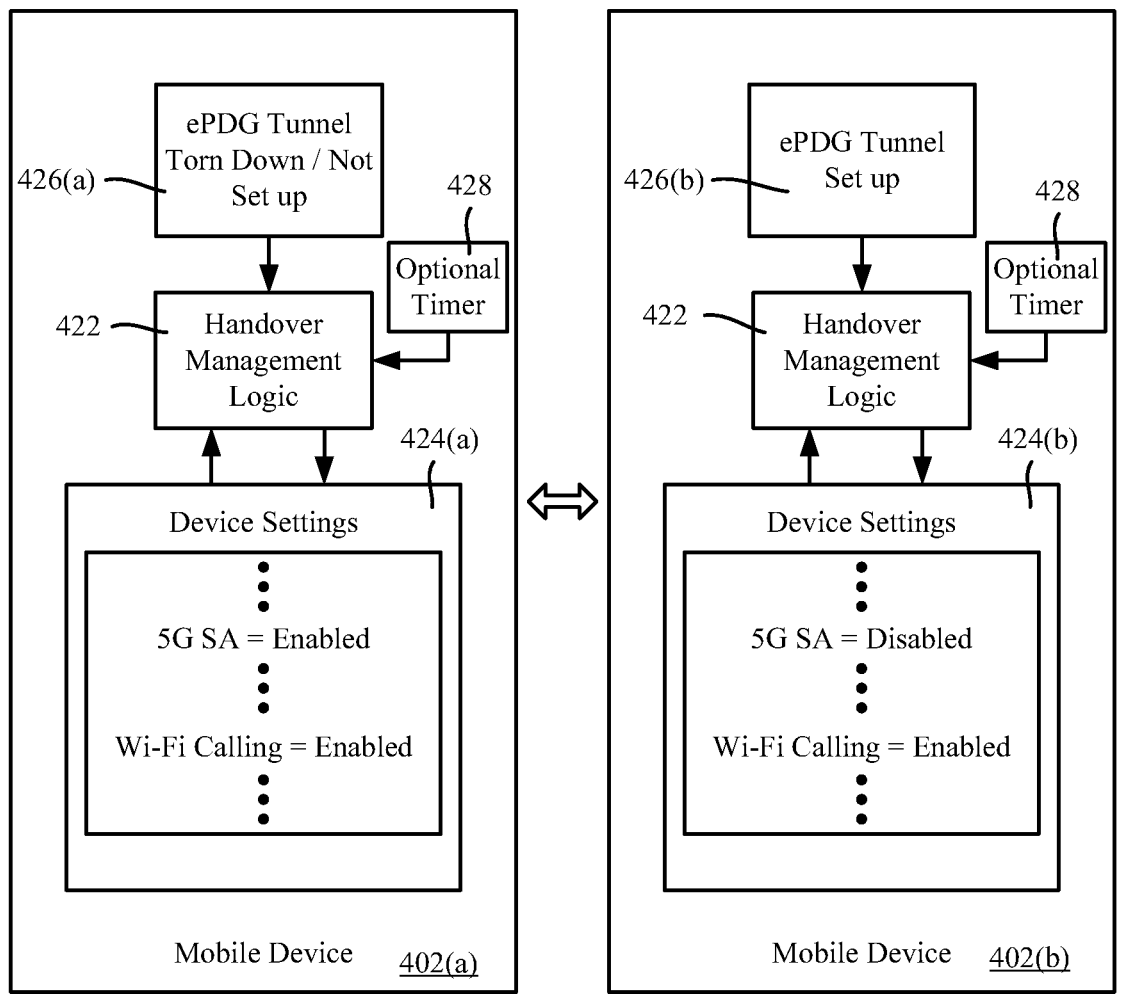
FIG. 4 is a block diagrams illustrating example components in a mobile device for managing a 5G standalone usage setting based on an evolved packet data gateway (ePDG) tunnel state, in accordance with various aspects and embodiments of the subject disclosure.

In yet another alternative technology generally represented in FIG. 4, 5G standalone is made dependent on whether an evolved packet data gateway (ePDG) tunnel has been set up (block 426(*b*)) or has been torn down or not yet set up (block 426(*a*)). In the example of FIG. 4, in a first state of a differently configured mobile device 402(*a*), handover management logic 422 allows 5G standalone to be enabled in the device settings 424(*a*) when, as detected via block 426(*a*), an ePDG) tunnel has not been set up (e.g., since the mobile device was powered up, or since Wi-Fi calling has been enabled, and so on) or has been torn down. Note that the user can choose to manually toggle (disable if enabled, enable if disabled) the 5G standalone setting when the mobile device 402(*a*) is in this first state with no ePDG tunnel having been set up or having been torn down (block 426(*b*)).

In a second state of the mobile device 402(*b*), when the mobile device 402(*b*) with Wi-Fi calling enabled in the settings 424(*b*) sets up an ePDG tunnel, e.g., using existing ePDG tunnel setup mechanisms, handover management logic 422 automatically toggles off 5G standalone (if 5G standalone was enabled) in the modified device settings 424(*b*). Further, when the mobile device 402(*b*) is in this second state, the handover management logic 422 deactivates (e.g., grays out) the ability to manually toggle the 5G standalone setting to prevent its re-enabling.

As a result, when a handover of a voice over Wi-Fi call to a cellular radio access network needs to be performed, the mobile device 402(*b*) in this state takes the conventional actions to handover the call to 4G instead of 5G standalone, and thereby avoids the call drop issue. In other words, the mobile device only disables the 5G standalone setting when an ePDG tunnel is currently setup. When the ePDG tunnel is torn down such that the mobile device 402(*a*) returns to the first state, the mobile device restores the 5G standalone setting (e.g., turns the 5G standalone toggle back on in the example of FIG. 4). The ability to manually toggle the 5G standalone setting is also reactivated when an ePDG tunnel is not set up.

Figure 5:
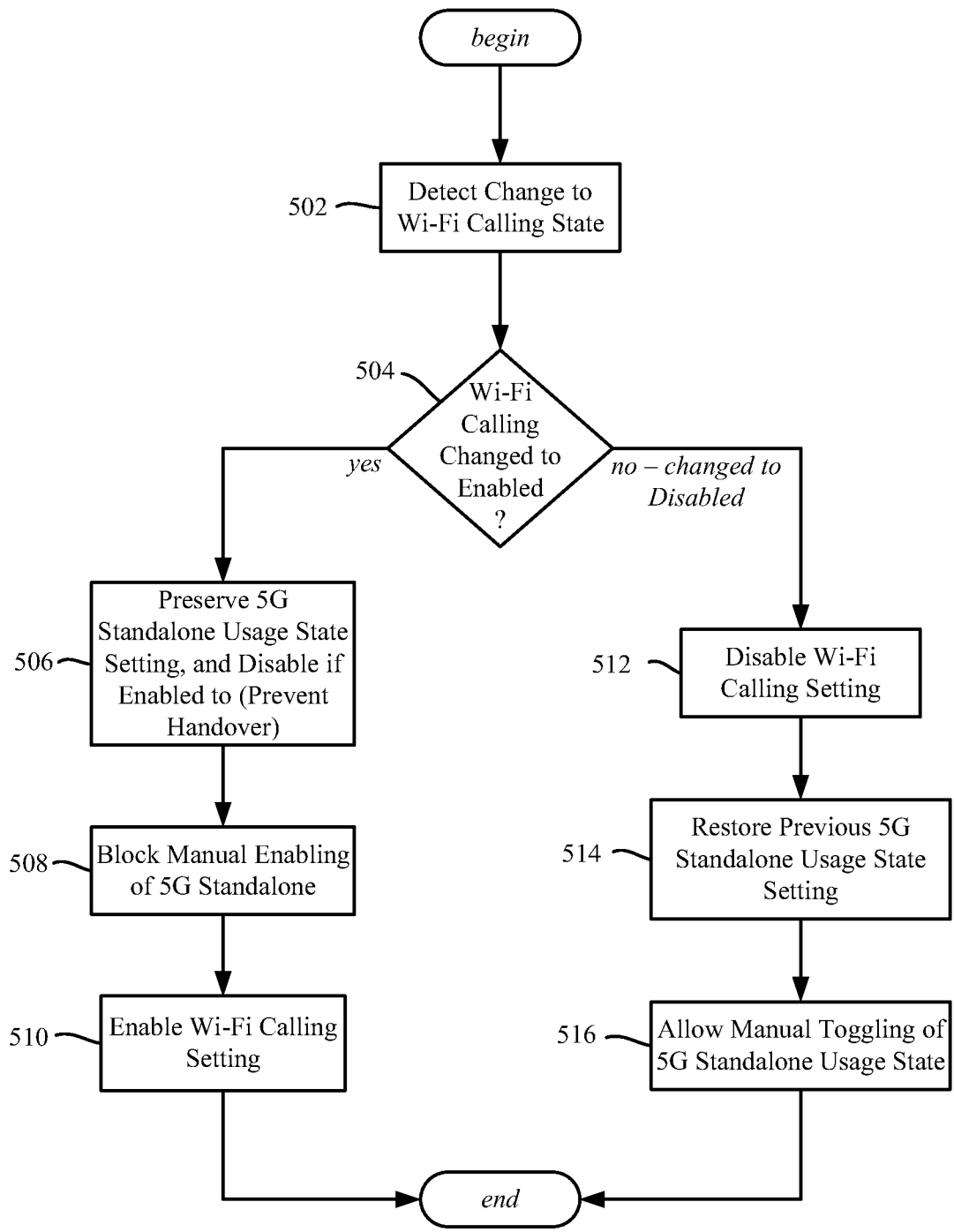
FIG. 5 is a flow diagram illustrating example operations of a mobile device for managing a 5G standalone usage setting based on a Wi-Fi calling setting, in accordance with various aspects and embodiments of the subject disclosure.

FIG. 5 is a flow diagram showing example operations corresponding to the example components of FIG. 2, beginning at operation 502 where the mobile device (e.g., the handover management logic 222 of FIG. 2) detects a change to the Wi-Fi calling state, e.g., in the mobile device settings. Such detection can be event driven, based on a callback from the device settings menu logic, or regularly polled. Alternatively, the handover management logic 222 can be incorporated into the device settings menu logic and notified in this way.

Operation 504 evaluates whether Wi-Fi calling was changed to enabled, or changed to disabled. If Wi-Fi calling is changed to be enabled, operation 506 preserves the current 5G standalone device setting, and if the 5G standalone device was enabled, disables the 5G standalone usage state setting, which prevents a handover from a Wi-Fi call to the 5G standalone network. Operation 508 blocks (deactivates, e.g., grays out) the manual re-enabling of the 5G standalone usage state. Note that although possibly already changed and detected, operation 510 explicitly represents enabling the Wi-Fi calling setting, such as performed via the device settings menu logic.

If instead operation 504 determines that the Wi-Fi setting was changed to disabled, operation 512 represents disabling the Wi-Fi calling setting, such as performed via the device settings menu logic. Operation 514 restores the saved 5G standalone usage setting (preserved at block 506), and operation 516 allows (reactivates) the manual toggling of the 5G standalone usage state.

Figure 6:
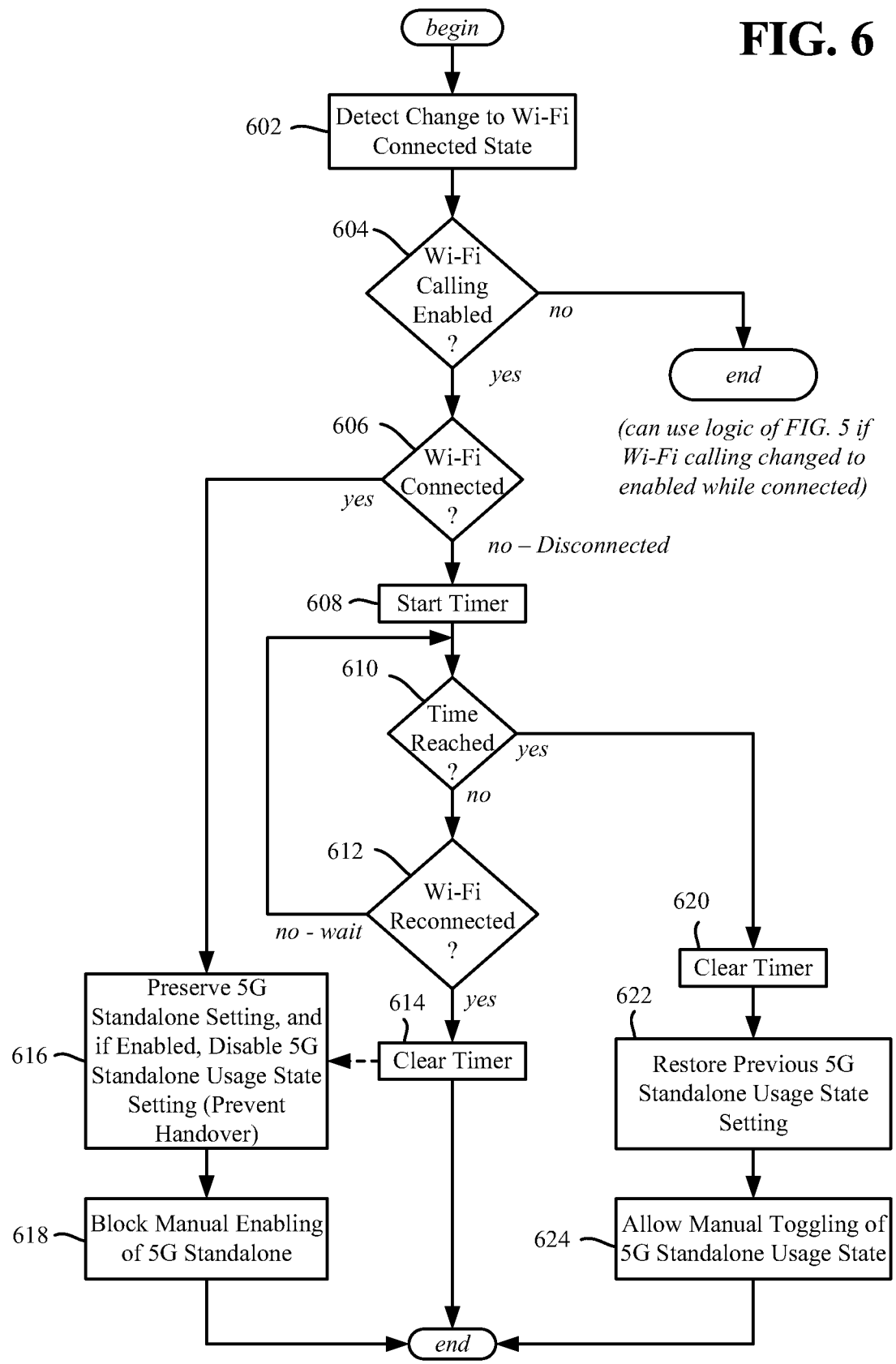
FIG. 6 is a flow diagram illustrating example operations of a mobile device for managing a 5G standalone usage setting based on a Wi-Fi calling setting and Wi-Fi connection state, in accordance with various aspects and embodiments of the subject disclosure.

FIG. 6 is a flow diagram showing example operations corresponding to the example components of FIG. 3, beginning at operation 602 where the mobile device (e.g., the handover management logic 322 of FIG. 3) detects a change to the Wi-Fi connection state. Operation 604 evaluates whether Wi-Fi calling is currently enabled, and if not, the process ends because the issue of a Wi-Fi call being dropped is not possible. Note however that a user can manually enable Wi-Fi calling while connected, and if so, the handover management logic 322 of FIG. 3 can use the example logic of FIG. 5 to turn off 5G standalone and prevent the handover drop problem if the Wi-Fi calling setting becomes manually changed to the enabled state while connected to a Wi-Fi network.

If Wi-Fi calling is enabled, and (as detected at operation 602) a Wi-Fi connection now exists as determined via operation 606, operation 616 preserves the current 5G standalone device setting, and if enabled, disables the 5G standalone usage state setting. This prevents a handover from a Wi-Fi call to the 5G standalone network. Operation 618 blocks (deactivates, e.g., grays out) the manual re-enabling of the 5G standalone usage state.

If Wi-Fi calling is enabled, but (as detected via operation 602) a Wi-Fi connection no longer exists as determined via operation 606, the preserved 5G standalone network setting can be restored. However, to avoid the 5G standalone setting being toggled on and off too frequently, e.g., due to mobile device Wi-Fi disconnect followed by a relatively rapid reconnect to Wi-Fi, in one implementation a timer (block 328 in FIG. 3) can be used such that the mobile device only restores the 5G standalone setting (preserved via operation 616) after the mobile device has been disconnected from Wi-Fi for a defined period of time/the timer reaches a time limit. The time can be set by default, by user configuration and/or by learning disconnect/reconnect patterns that potentially can cause issued.

To this end, if the detected change to the Wi-Fi state at operation 602 was to disconnect from Wi-Fi, operation 608 starts a timer (which can be cleared at operation 608, or alternatively cleared when no longer needed), and operation 610 checks for the time limit being reached. Until reached, operation 612 evaluates whether Wi-Fi is reconnected. If reconnected, operation 614 clears the timer, and the process ends. Note that optionally the process can branch to operations 616 and 618 as described above if there is any way in which the 5G standalone setting can have been otherwise restored or enabled.

If the time limit is reached at operation 610, that is, the mobile device has not reconnected to a Wi-Fi network, operation 620 clears the timer, and operation 622 restores the saved 5G standalone usage setting, (which was preserved at block 616). Operation 624 allows (reactivates) the manual toggling of the 5G standalone usage state.

Figure 7:
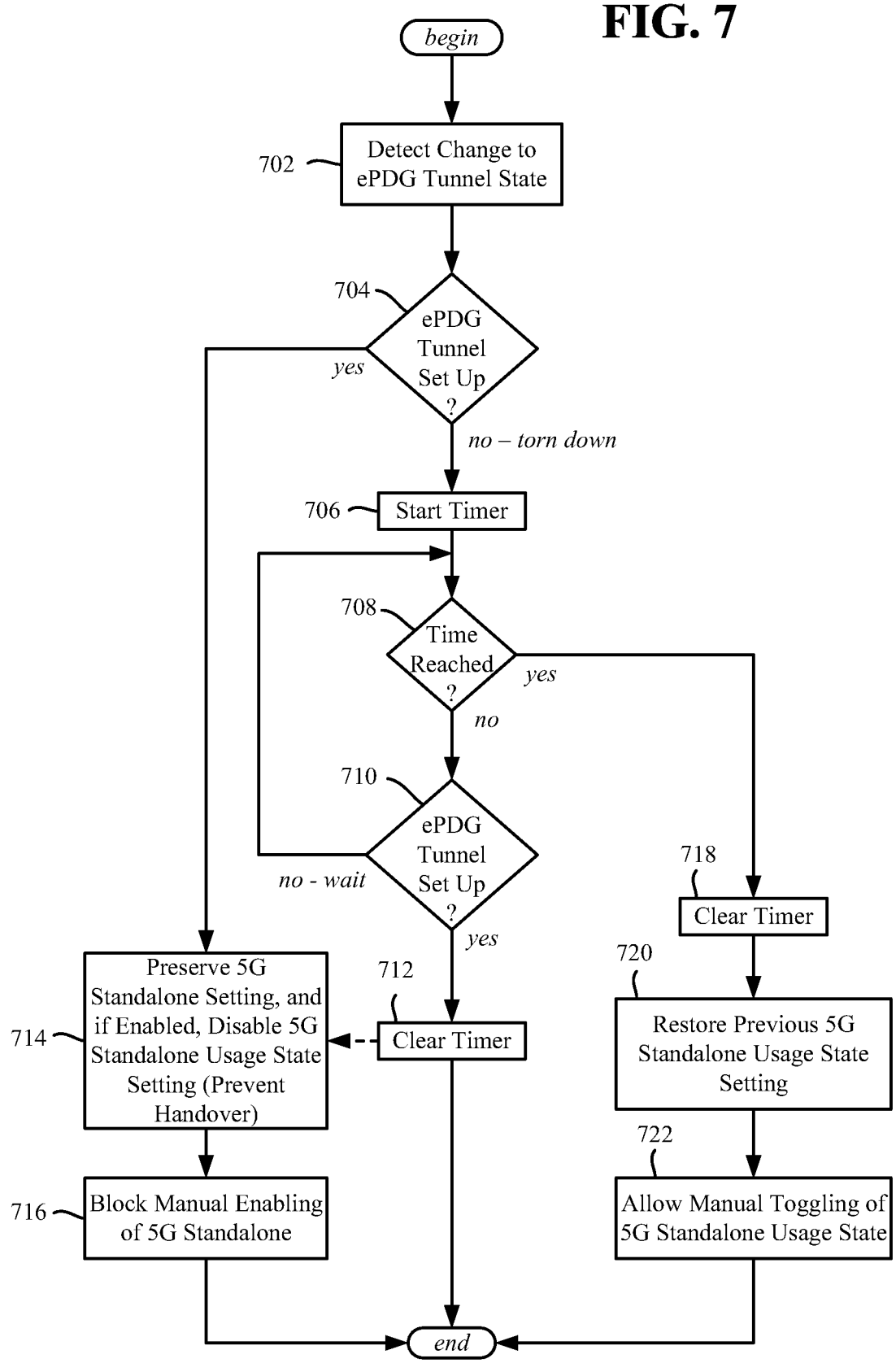
FIG. 7 is a flow diagram illustrating example operations of a mobile device for managing a 5G standalone usage setting based on an evolved packet data gateway (ePDG) tunnel state, in accordance with various aspects and embodiments of the subject disclosure.

FIG. 7 is a flow diagram showing example operations corresponding to the example components of FIG. 4, beginning at operation 702 where the mobile device (e.g., the handover management logic 422 of FIG. 4) detects a change to the ePDG tunnel state. Operation 704 evaluates whether an ePDG tunnel is set up. If so operation 714 preserves the current 5G standalone device setting, and if enabled, disables the 5G standalone usage state setting, which prevents a handover from a Wi-Fi call to the 5G standalone network.

Operation 716 blocks (deactivates, e.g., grays out) the manual re-enabling of the 5G standalone usage state.

If instead at operation 704 of FIG. 7 the ePDG tunnel has been torn down, similar to the logic of FIG. 6, to avoid the 5G standalone setting being toggled on and off too frequently, e.g., to avoid a "ping-pong" like behavior from rapidly changing the 5G standalone setting, in the operations of FIG. 7 a timer (block 428 in FIG. 4) is likewise used. With the timer, the mobile device can only turn the 5G standalone toggle on when an ePDG tunnel has been torn done for a certain time (as measured by the timer) and the device does not re-setup the ePDG tunnel.

To this end, operation 706 starts a timer (which can be cleared as part of operation 706, or alternatively cleared when no longer needed), and operation 708 checks for the time limit being reached. Until reached, operation 710 evaluates whether the ePDG tunnel is re-setup. If so, operation 712 clears the timer, and the process ends. Note that optionally the process can branch to operations 714 and 716 as described above if there is any way in which the 5G standalone setting can be otherwise restored or enabled while operations 708 and 710 were executing.

Returning to operation 708, in the event that the time limit is instead reached, operation 718 clears the timer, and operation 720 restores the saved 5G standalone usage setting (preserved at block 714). Operation 722 allows (reactivates) the manual re-enabling of the 5G standalone usage state.

Figure 8:
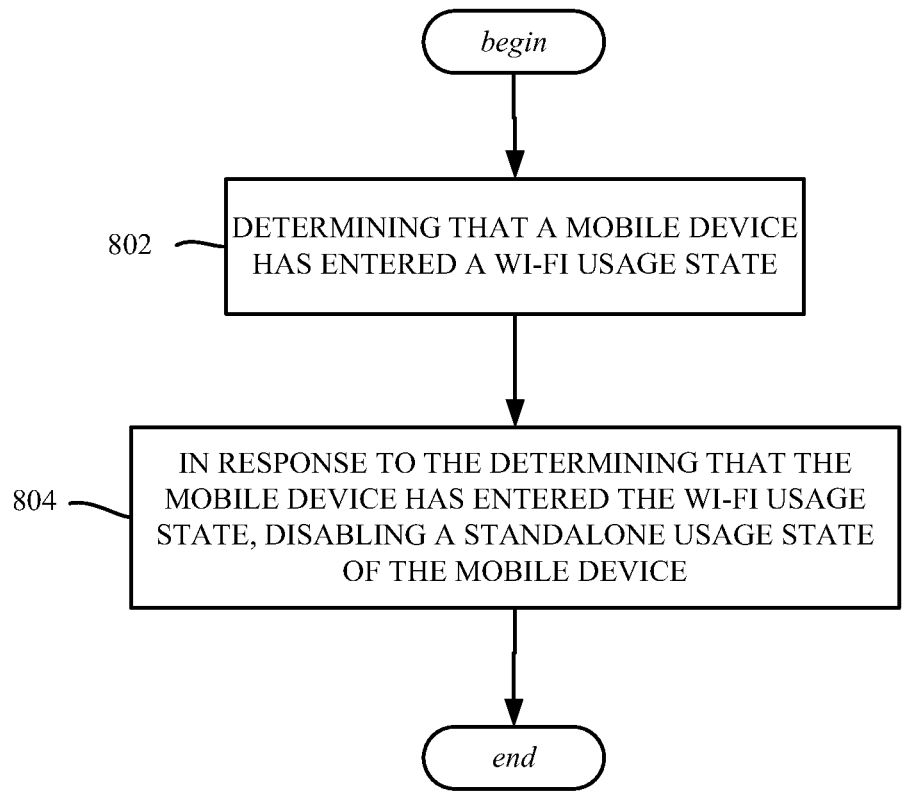
FIG. 8 illustrates example operations related to disabling a 5G usage state based on a Wi-Fi usage state of a mobile device, in accordance with various aspects and embodiments of the subject disclosure.

One or more example aspects are represented in FIG. 8, and can correspond to a system, comprising a processor, and a memory that stores executable instructions that, when executed by the processor of the system, facilitate performance of operations. Example operation 802 represents determining that a mobile device has entered a Wi-Fi usage state. Operation 802 represents, in response to the determining that the mobile device has entered the Wi-Fi usage state, disabling a standalone usage state of the mobile device.

Determining that the mobile device has entered the Wi-Fi usage state can include detecting that the mobile device has Wi-Fi calling enabled.

Determining that the mobile device has entered the Wi-Fi usage state can include detecting that that the mobile device has Wi-Fi calling enabled and detecting that the mobile device is connected to a Wi-Fi access point device.

Further operations can include determining that the mobile device is no longer connected to the Wi-Fi access point device, and, in response to the determining that the mobile device is no longer connected to the Wi-Fi access point device, enabling the standalone usage state of the mobile device.

Determining that the mobile device has entered the Wi-Fi usage state can include detecting that that the mobile device has set up an evolved packet data gateway.

The mobile device can be in the standalone usage state, which can include the mobile device being in a fifth generation standalone usage state in accordance with a fifth generation communication network protocol, and further operations can include determining that the mobile device is currently active with respect to a Wi-Fi call, determining a request to handover the Wi-Fi call to a cellular network call, and, in response to the request, performing a handover of the Wi-Fi call to the cellular network call.

The Wi-Fi call can be a first Wi-Fi call, the handover of the first Wi-Fi call to the cellular network call can be a first handover, and further operations can include performing a second handover of the cellular network call to a second Wi-Fi call. Performing the handover of the Wi-Fi call of the mobile device to the cellular network call can include performing the handover to network equipment that is part of a fifth generation non-standalone radio access network.

Performing the handover of the Wi-Fi call of the mobile device to the cellular network call can include performing the handover to network equipment that communicates in accordance with a fourth generation long term evolution radio access network protocol.

The network equipment can be first network equipment, the handover of the Wi-Fi call to the first network equipment that communicates in accordance with the fourth generation long term evolution radio access network protocol can be a first handover, and further operations can include enabling the fifth generation standalone usage state of the mobile device, and performing a second handover from the first network equipment to second network equipment that is part of a fifth generation standalone radio access network.

Further operations can include determining that the mobile device has exited the Wi-Fi usage state, and, in response to the determining that the mobile device has exited the Wi-Fi usage state, enabling, after a delay period, the standalone usage state of the mobile device.

Figure 9:
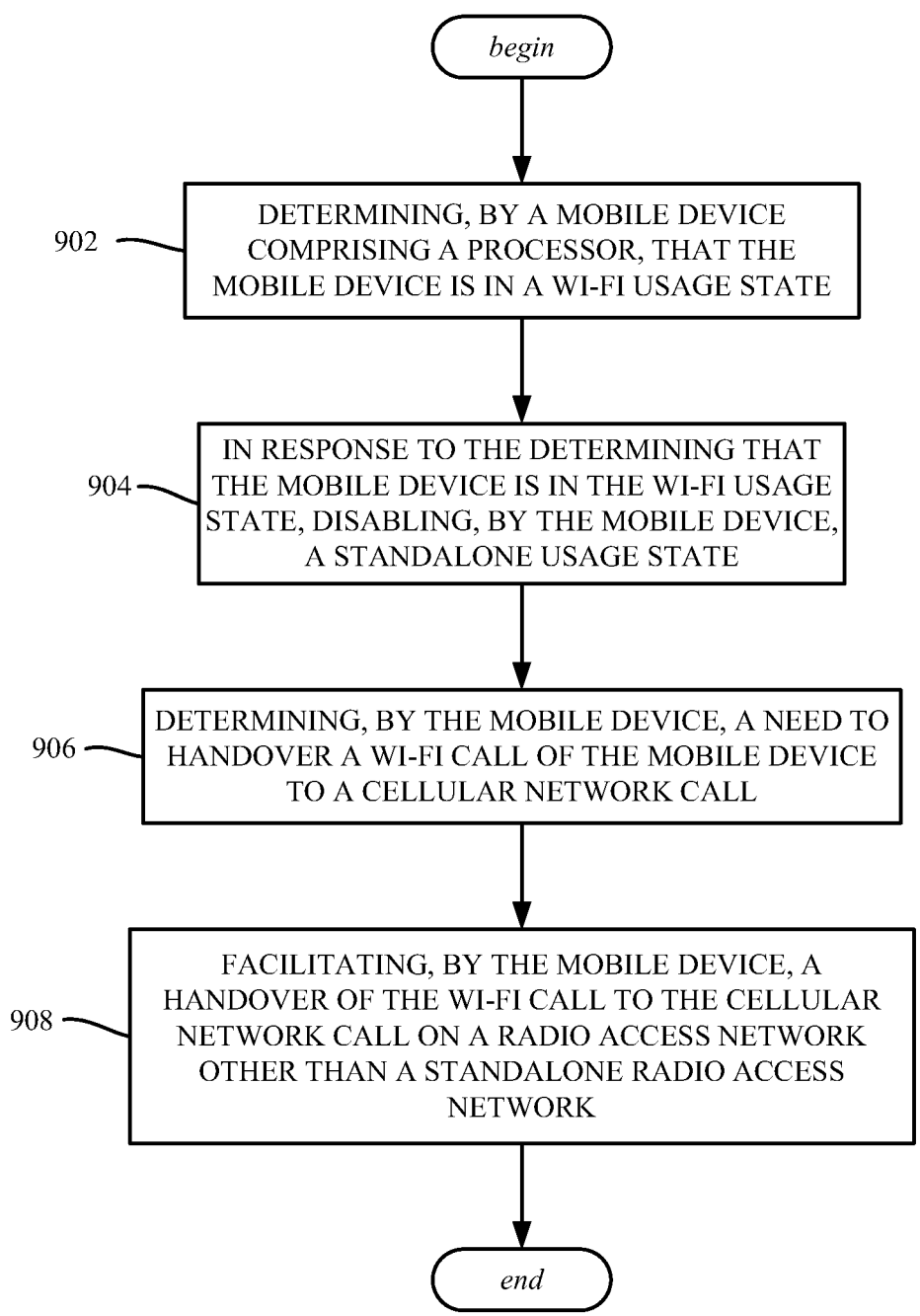
FIG. 9 illustrates example operations related to disabling a 5G usage state based on a Wi-Fi usage state of a mobile device to facilitate a handover to a cellular radio access network, in accordance with various aspects and embodiments of the subject disclosure.

One or more example aspects are represented in FIG. 9, and can correspond to example operations of a method. Operation 902 represents determining, by a mobile device comprising a processor, that the mobile device is in a Wi-Fi usage state. Operation 904 represents, in response to the determining that the mobile device is in the Wi-Fi usage state, disabling, by the mobile device, a standalone usage state. Operation 906 represents determining, by the mobile device, a need to handover a Wi-Fi call of the mobile device to a cellular network call.

Operation 908 represents facilitating, by the mobile device, a handover of the Wi-Fi call to the cellular network call on a radio access network other than a standalone radio access network.

Determining that the mobile device is in the Wi-Fi usage state can include determining that the mobile device has Wi-Fi calling enabled, or determining that that the mobile device has Wi-Fi calling enabled and determining that the mobile device is connected to a Wi-Fi access point.

Determining g that the mobile device is in the Wi-Fi usage state can include detecting that that the mobile device has an evolved packet data gateway set up.

The standalone usage state can be a fifth generation standalone usage state associated with a fifth generation communication network; operations can include determining, by the mobile device, that the mobile device is no longer in the Wi-Fi usage state, and, in response to the determining that the mobile device is no longer in the Wi-Fi usage state, enabling, by the mobile device, the standalone usage state of the mobile device.

The handover of the Wi-Fi call to the cellular network can be a first handover, and further operations can include facilitating, by the mobile device, a second handover from cellular network equipment that is part of the cellular network that is not a fifth generation standalone cellular network to network equipment that is part of a fifth generation standalone radio access network.

Figure 10:
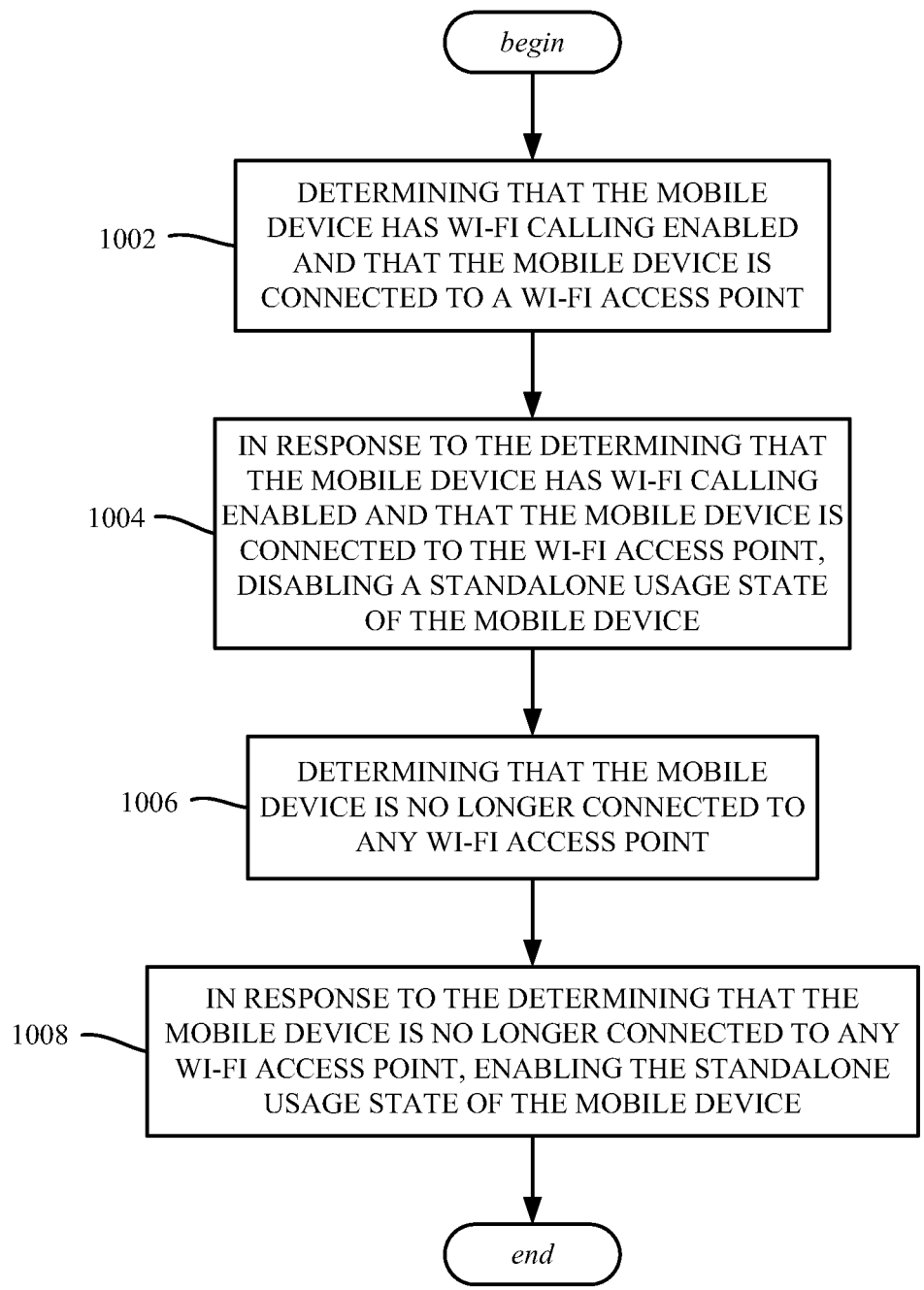
FIG. 10 illustrates example operations related to disabling or enabling a 5G usage state based on a Wi-Fi connection of a mobile device, in accordance with various aspects and embodiments of the subject disclosure.

One or more aspects are represented in FIG. 10, such as implemented in a machine-readable medium, comprising executable instructions that, when executed by a processor of a mobile device, facilitate performance of operations. Example operation 1002 represents determining that the mobile device has Wi-Fi calling enabled and that the mobile device is connected to a Wi-Fi access point. Operation 1004 represents, in response to the determining that the mobile device has Wi-Fi calling enabled and that the mobile device is connected to the Wi-Fi access point, disabling a standalone usage state of the mobile device. Operation 1006 represents determining that the mobile device is no longer connected to any Wi-Fi access point. Operation 1008 represents, in response to the determining that the mobile device is no longer connected to any Wi-Fi access point, enabling the standalone usage state of the mobile device.

The standalone usage state can be a fifth generation standalone usage state in accordance with a fifth generation communication network protocol, and further operations can include, prior to enabling the fifth generation standalone usage state of the mobile device, transferring a Wi-Fi call using a Wi-Fi connection to a cellular network call using a network connection of a radio access network.

Further operations can include, after the enabling of the fifth generation standalone usage state of the mobile device, transferring the cellular network call from using the network connection to using a different network connection of a fifth generation standalone radio access network.

Enabling of the standalone usage state of the mobile device can occur after a defined time delay from the determining that the mobile device is no longer connected to any Wi-Fi access point.

As can be seen, the technology described herein prevents a handover of a Wi-Fi call to a 5G standalone network, which prevents a call drop scenario. The technology is practical to implement, and can be implemented in alternative ways, including ways that facilitate camping on a 5G standalone network whenever the call drop scenario is not a potential issue.

Turning to aspects in general, a wireless communication system can employ various cellular systems, technologies, and modulation schemes to facilitate wireless radio communications between devices (e.g., a user equipment/UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 11:
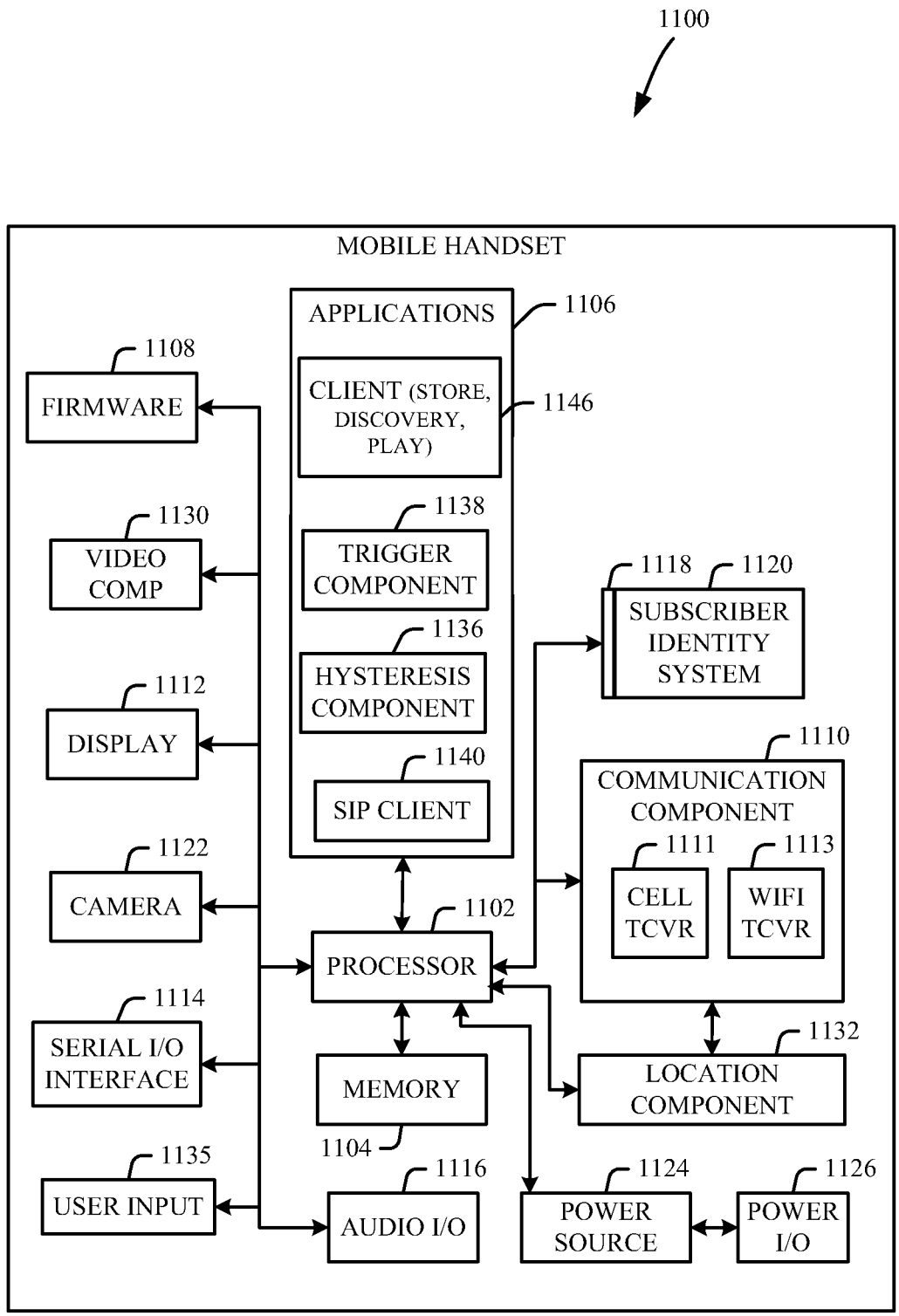
FIG. 11 illustrates an example block diagram of an example mobile handset operable to engage in a system architecture that facilitates wireless communications according to one or more embodiments described herein.

Referring now to FIG. 11, illustrated is a schematic block diagram of an example end-user device (such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
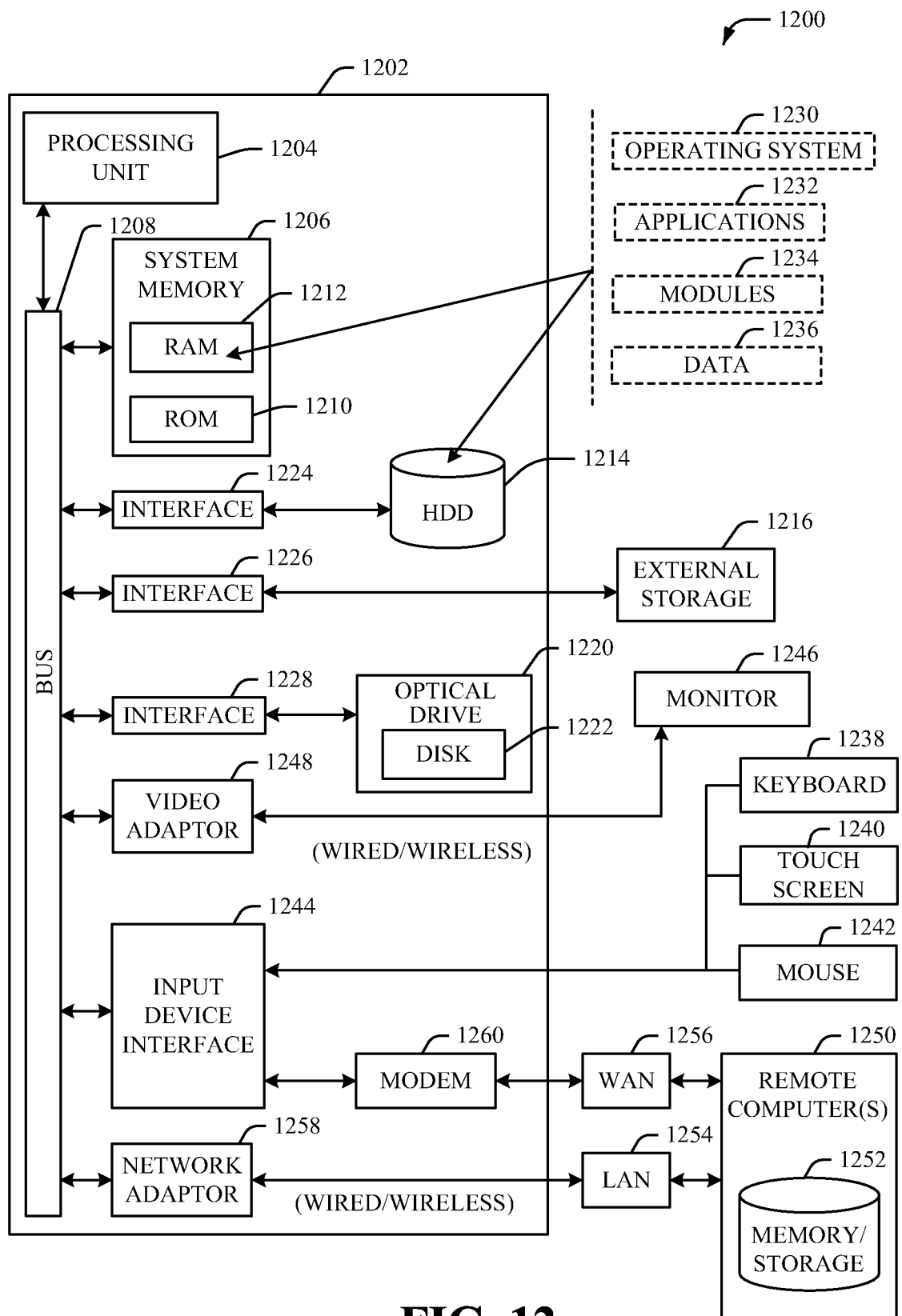
FIG. 12 illustrates an example block diagram of an example computer/machine system operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD), non-volatile memory and other storage technology could be used in addition to, or in place of, an HDD 1214, and can be internal or external. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1194 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    determining, by a user equipment comprising a processor, that a user configurable Wi-Fi calling setting of the user equipment has been set to enabled, resulting in a first determination;
    based on the first determination, changing, by the user equipment, a user configurable standalone network setting to be set to disabled and restricting, by the user equipment, manual enabling of the user configurable standalone network setting;
    determining, by the user equipment, that the user equipment has disconnected from a Wi-Fi network, resulting in a second determination;
    setting, by the user equipment, a delay period based on the second determination; and
    based on elapsing of the delay period, permitting, by the user equipment, manual enabling of the user configurable standalone network setting, thereby allowing the user equipment to camp on resources of a standalone network, wherein the permitting is based on a determination by the user equipment that the user equipment has not reconnected to the Wi-Fi network by elapsing of the delay period.

2. The method of claim 1, further comprising, prior to the changing, determining, by the user equipment, that the user equipment is connected to the Wi-Fi network, resulting in a third determination, wherein the changing is further based on the third determination.

3. The method of claim 1, further comprising, prior to the second determination, performing, by the user equipment, a handover of a call from the Wi-Fi network to a non-standalone network.

4. The method of claim 3, further comprising, after the permitting, performing, by the user equipment, a subsequent handover of the call from the non-standalone network to the standalone network, thereby avoiding a drop call issue that would otherwise result if the call is handed over directly from the Wi-Fi network to the standalone network.

5. The method of claim 1, wherein the standalone network comprises a fifth generation (5G) standalone network.

6. The method of claim 1, wherein the user equipment is a mobile phone.

7. The method of claim 1, wherein the user equipment is an Internet of Things device.

8. A user equipment, comprising:
    a processor; and
    a memory that stores executable instructions that, when executed by the processor, facilitate performance of operations, comprising:
    determining that a user configurable Wi-Fi calling setting of the user equipment has been enabled, resulting in a first determination;
    based on the first determination, changing a user configurable standalone network setting to be set to disabled and restricting manual enabling of the user configurable standalone network setting;
    determining that the user equipment is not connected to a Wi-Fi network, resulting in a second determination;
    defining a delay period based on the second determination; and
    based on elapsing of the delay period, permitting manual enabling of the user configurable standalone network setting, thereby allowing the user equipment to camp on resources of a standalone network, wherein the permitting is further based on a determination that the user equipment has not connected to the Wi-Fi network by elapsing of the delay period.

9. The user equipment of claim 8, wherein the operations further comprise, prior to the changing, determining that the user equipment is connected to the Wi-Fi network, resulting in a third determination, wherein the changing is further based on the third determination.

10. The user equipment of claim 8, wherein the operations further comprise, prior to the second determination, performing a handover of a call from the Wi-Fi network to a non-standalone network.

11. The user equipment of claim 10, wherein the operations further comprise, after the permitting, performing a subsequent handover of the call from the non-standalone network to the standalone network, thereby avoiding a drop call issue that would otherwise result if the call is handed over directly from the Wi-Fi network to the standalone network.

12. The user equipment of claim 8, wherein the user equipment is a personal computer.

13. The user equipment of claim 8, wherein the user equipment is a cell phone or an Internet of Things device.

14. The user equipment of claim 8, wherein the standalone network comprises a new radio (NR) network.

15. A non-transitory machine-readable medium, comprising executable instructions that, when executed by a processor of a user equipment, facilitate performance of operations, comprising:
- determining that a user configurable Wi-Fi calling setting of the user equipment has been set to enabled, resulting in a first determination;
- based on the first determination, changing a user configurable standalone network setting to be set to disabled and restricting manual enabling of the user configurable standalone network setting;
- determining that the user equipment has lost connection to a Wi-Fi network, resulting in a second determination;
- setting a delay period based on the second determination; and
- after elapsing of the delay period, permitting manual enabling of the user configurable standalone network setting, thereby allowing the user equipment to camp on resources of a standalone network, wherein the permitting is further based on a determination that the user equipment has not reconnected to the Wi-Fi network by elapsing of the delay period.

16. The non-transitory machine-readable medium of claim 15, wherein the operations further comprise, prior to the changing, determining that the user equipment is connected to the Wi-Fi network, resulting in a third determination, wherein the changing is further based on the third determination.

17. The non-transitory machine-readable medium of claim 15, wherein the operations further comprise, prior to the second determination, performing a handover of a call from the Wi-Fi network to a non-standalone network.

18. The non-transitory machine-readable medium of claim 17, wherein the operations further comprise, after the permitting, performing a subsequent handover of the call from the non-standalone network to the standalone network, thereby avoiding a drop call issue that would otherwise result if the call is handed over directly from the Wi-Fi network to the standalone network.

19. The non-transitory machine-readable medium of claim 15, wherein the user equipment is a mobile communications device.

20. The non-transitory machine-readable medium of claim 15, wherein the user equipment is an Internet of Things device.

* * * * *